UNITED STATES PATENT OFFICE.

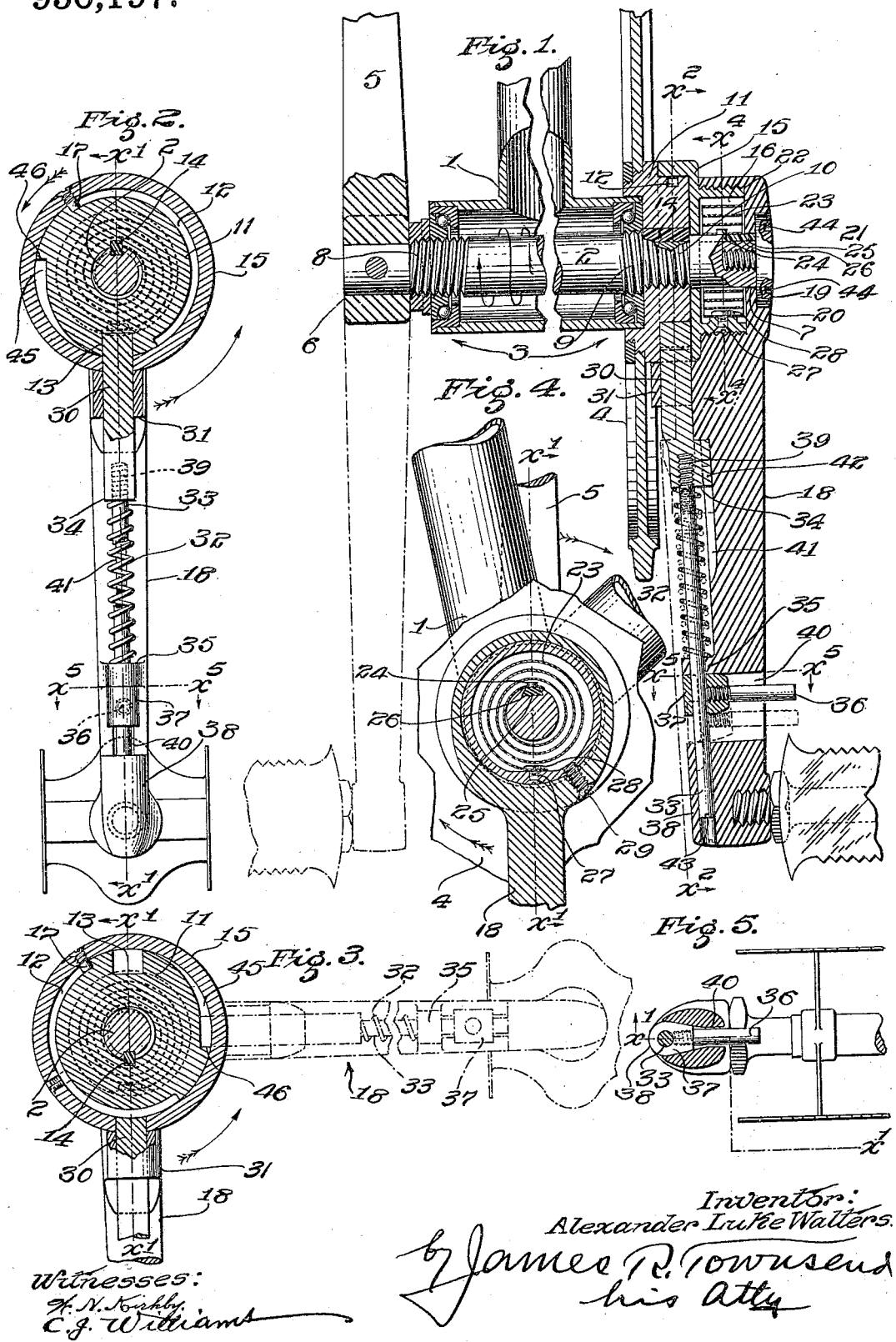

ALEXANDER LUKE WALTERS, OF LOS ANGELES, CALIFORNIA.

ADJUSTABLE CRANK-HANGER FOR MOTOR-CYCLES.

950,197.  Specification of Letters Patent.  Patented Feb. 22, 1910.

Application filed March 17, 1908. Serial No. 421,729.

*To all whom it may concern:*

Be it known that I, ALEXANDER LUKE WALTERS, a citizen of the United States, residing at Los Angeles, in the county of Los Angeles and State of California, have invented a new and useful Adjustable Crank-Hanger for Motor-Cycles, of which the following is a specification.

This invention relates to vehicles provided with a seat for the rider, and with pedals that are adapted to be connected with, and disconnected from the driving-wheel of the machine so that the pedals may be used for starting or propelling the machine when desired, and may, at will, be held stationary as a support for the rider.

The object of this invention is to provide safe and satisfactory means whereby the rider of a motor-cycle or bicycle, can, at his pleasure, bring both of the pedals of the machine to their fully-depressed position at the same time, so that he can rest his weight upon both feet with his legs equally extended to lift himself from the seat and may yet retain full control over the crank-axle; thereby to safely avoid the disagreeable and injurious jarring to which the riders of safety or motor-cycles having cranks of the present most common construction are subjected by reason of the great vibration of the vehicle, caused by rapidly traveling over uneven ground, and to bring the center of support close to the ground to prevent skidding.

This invention may be embodied in various forms, and I do not limit myself to any specific construction, but desire to secure the exclusive right to the invention in every form of embodiment of which it is capable.

The invention broadly considered comprises an axle, cranks thereon, adjustable relative to each other, and releasable means to hold the cranks in fixed relation to each other in both directions so that when the rider desires he may hold the axle against rotation in either direction and subject to rotation in either direction by operation of the cranks, or either of them, so that the rider may back-pedal with either crank so as to use the coaster-brake for stopping with his weight on either pedal.

The accompanying drawings illustrate the invention in the form I at present deem most advisable.

Figure 1 is a fragmental, sectional elevation on line $x^1$, Figs. 2, 3, 4 and 5, of a motor-cycle provided with my invention. Only a portion of the motor-cycle-frame is shown. The adjustable crank is shown with the pedal depressed and the parts in position for driving the crank-axle to which the driving-wheel is attached. Dotted lines indicate the position of parts to release the adjustable crank; and broken lines at the left of the view indicate the position into which the rigid crank may be brought while the adjustable crank is released in the position shown. Fig. 2 is an elevation partly in section, looking to the right from line $x^2$, Fig. 1. Fig. 3 is a section on the same plane as Fig. 2 with the crank released. Broken lines indicate the position into which the spiral spring will bring the crank when the pressure of the foot is released to allow the use of a coaster-brake, not shown. Fig. 4 is a sectional detail on line $x^4$, Fig. 1, looking toward the left. Fig. 5 is a sectional plan on line $x^5$, Figs. 1 and 2.

1 designates the crank-hanger, the same being a portion of the frame; 2, the crank-axle; 3, the crank-axle bearings; 4, the driving wheel held in fixed relation to the crank-axle by means hereinafter described, and 5 one of the cranks of a motor-cycle of a common construction. It is to be understood that the driving wheel 4 is one element for driving the traction wheel of the motor-cycle to start the same and for operating the coaster-brake to prevent rotation of said traction wheel. The traction wheel, the brake mechanism therefor, the motor-cycle engine and its connections, and the means for connecting the driving element 4 with said traction wheel and with the brake-mechanism are all omitted from the view to avoid confusion, and it is to be understood that any of said elements may be of the usual construction.

The crank-axle 2 is provided at its ends with crank-seats 6 and 7, and with reversely screw-threaded portions 8 and 9 to receive ball-bearing elements, and between one of said screw-threaded portions 9 and its adjacent crank-seat 7 with a screw-threaded portion 10 of less diameter than the screw-threaded portion 9.

11 is a clutch-disk on which the driving-wheel 4 is fixed. Said clutch-disk is provided with a peripheral slot 12 and a bolt-seat 13 and is screwed onto the last-mentioned screw-threaded portion 10.

14 is a key to fix the clutch-disk 11 against rotation relative to the crank-axle 2, and 15 is a spring-case rotatable on the clutch-disk 11 and provided with an externally screw-threaded jam portion 16.

17 is a stop fixed to the spring-case and extending into the peripheral slot to limit the rotation of the spring-case relative to the clutch-disk. Said slot 12 is semicircular and extends over 180 degrees of a circle in order to accommodate the stop 17 and to allow a rotary movement throughout 180 degrees.

18 is a crank screwed onto the spring-case 15 and rotatably secured to the axle by a screw 19 that is accommodated within a seat 20 and engages a shoulder 21 of the crank 18, thereby to allow the crank 18 to rotate relative to the crank-axle 2, while at the same time being held from movement along the axle. The crank is provided with a screw-threaded socket 22 which screws upon the spring-case 15.

23 designates a spring inside the spring-case 15 and fastened to the crank-axle 2 by a pin 24 screwed into a slide 25 that is seated in the slot 26 that accommodates the key 14 that holds the clutch-disk from rotation on the axle 2. The other end of the spring 23 is secured to the spring-case by a screw 27 which extends through the wall of the spring-case and through the spring, and is screwed into a nut 28 secured against the inside of the spring. The crank 18 is fixed to the spring-case 15 by a screw 29.

30 designates a bolt movably mounted in a way 31 in the crank 18 and adapted to be inserted into and withdrawn from the bolt-seat 13.

31 is a spring to normally hold the bolt 30 in the bolt-seat 13, the same being around a stem 33 and between a shoulder 34 of the bolt and a guide 35 for said stem on the crank.

36 is a pin adjustably secured to the stem 33 by a collar 37 into which the pin 36 is screwed to jam against the stem 33; which stem extends through the guide 35 and plays in another guide 38 at the end of the crank. The end 39 of the stem 33 is screw-threaded and screwed into the end of the bolt 30 so as to be detachable therefrom. The pin 36 extends through a longitudinal slot 40 in the crank 18, and when it is screwed home against the stem 33 its engagement with the walls of the slot prevents rotation and consequent loosening of the stem 33.

41 is a longitudinal guide-way in the crank 18 to accommodate a feather 42 which projects from the bolt into said guide-way to prevent looseness of the bolt. The end of the stem 33 may be provided with a kerf 43 to receive a screw-driver by which the stem may be screwed into and out of the bolt whenever the pin 36 is unscrewed.

The screw 19 that holds the crank on the crank-axle 2 may be provided with spanner-seats 44 for a spanner wrench, not shown, by which the screw can be turned. Said screw seats solidly with relation to the crank-axle 2 without clamping the crank 18, thus allowing the crank to rotate freely on the crank-axle 2 except as such rotation is limited by the stop 17, bolt 30, or spring 23. The tension of the spring is such as to normally hold the parts in the relative positions shown in Figs. 1 and 2, with the stop 17 at the end of the slot 12 farthest removed from the bolt-seat 13, so that when the bolt is removed from said bolt-seat no change of position will occur except the pressure be applied to increase the tension of the spring.

When the operator desires to bring the crank 5 into the dotted position in Fig. 1, he will depress the pin 36 into the dotted position in Fig. 1, thus withdrawing the bolt 30 from its seat 13, as seen in Fig. 3; and then will apply pressure with his foot upon the pedal of the crank 5, thereby to bring said crank down into the position indicated in broken lines in Fig. 1. When the cranks are shifted from the diametrically opposite position shown in Fig. 1, the bolt-seat no longer registers with the bolt 30, and the pin 36 may then be released, and the rider may then rest his foot solidly upon the pedal of the crank 18 while at the same time he forces the crank 5 down into its fully depressed position shown in broken lines in Fig. 1, whereupon he is able to ride freely, supporting his weight entirely by his feet, thus bringing the center of gravity close to the ground, thereby increasing the safety of riding and avoiding the danger of skidding.

45 designates an intermediate seat to form a ratchet-stop for the bolt 30 to catch the crank 18 and hold the same at a quartering position relative to the crank 5, thus to give the rider control over the crank-axle for the purpose of controlling the brake mechanism; the seat 45 affording an abrupt abutment 46 at one end and diminishing in depth from such abutment toward the bolt-seat 13, so that when the bolt 30 is free to enter the seat 45 the rider may allow the spring to bring the crank 18 up into the position indicated in broken lines in Fig. 3, whereupon the bolt will seat in the seat 45, and a downward pressure upon the pedal of the crank 18 will rotate the clutch-disk 11 and the crank-axle and the element 4, thus to tighten the brake.

When the coaster-brake is in use with the cranks 5 and 18 quartering with each other, both pedals may be used for rotating the crank-axle,—the crank 5 to release the brake and the crank 18 to tighten it,—but when it is desired to again bring the cranks into the position with both pedals fully depressed, it is necessary to allow the cranks 18 and 5 to return by the force of the spring to their relative positions shown in Figs. 1 and 2; whereupon the rider can then bring his foot to bear upon the pin 36, thus to release the bolt and allow the parts to be brought into position with both pedals depressed. Both pedals may now be used to sustain the weight of the rider.

I claim:—

1. A crank axle provided at its ends with crank-seats and provided with reversely screw-threaded portions to receive ball-bearing elements, and provided between one of said threaded portions and its adjacent crank-seat with a screw-threaded portion of smaller diameter, a clutch disk provided with a peripheral slot and a bolt seat and screwed onto the last-mentioned screw-threaded portion, a key to fix said clutch disk against rotation, a spring case rotatable on the clutch disk, a stop fixed to the spring case and extending into said peripheral slot, a crank screwed onto the spring case, a screw to secure the crank on the axle, a spring fixed at one end to the axle and at the other end to the spring case, and a bolt carried by the last-mentioned crank, means for holding said bolt in said bolt seat, and means for retracting said bolt from said bolt seat.

2. In a motor-cycle, a crank-axle, a crank fixed to said axle, a crank rotatable relative to said axle, releasable means to hold the last-named crank on said axle against rotation in either direction, means movable on the last-named crank and adapted to be engaged by the foot of the rider to release the crank-holding means, a spring to rotate the last-named crank on the axle when the crank-holding means is released, and a stop to limit such rotation.

3. A crank-axle, a crank fixed thereon, a crank rotatably mounted on the axle, a spring fixed to the axle and to the crank tending to rotate said crank, a stop to limit such rotation, releasable means to hold the last-named crank in fixed relation to the crank axle in both directions, and a pin movable on said rotatable crank in position to be engaged by the foot of the rider to release said releasable means.

4. In a motor-cycle coaster, the combination with a propelling and coaster-brake wheel, of a clutch-disk fixed to said wheel; a crank rotatably mounted on said clutch-disk; a stop to limit the rotation of the crank on said disk; a bolt to lock the crank on the disk, said disk being provided with a bolt-seat to receive said bolt and prevent rotation of the crank in either direction on said clutch-disk; and a ratchet-stop on the disk to engage the bolt so that the disk may be turned by the crank in one direction when the bolt is in engagement therewith and the crank may turn in the other direction when the crank is released.

5. The combination of a crank-axle; a crank fixed to one end thereof; a crank rotatably mounted on the other end of the crank-axle; a driving-wheel in fixed relation to the crank-axle; a clutch-disk fixed to the crank-axle and provided with a stop to limit the movement of the crank on the disk; a bolt carried by the crank; a spring carried by the crank to hold the bolt normally in engagement with the disk, said disk being provided with a seat into which the bolt may enter to hold the bolt against rotation of the crank in either direction relative to the disk; said disk being also provided with a ratchet-seat into which the bolt may enter to prevent the crank from moving relative to the disk in one direction; and a spring to move the crank to carry the bolt from the ratchet-seat to the other seat.

6. In a motor-cycle, a crank-hanger; a crank-axle therein provided at its ends with crank-seats and with reversely-screw-threaded portions to receive ball-bearing elements, and between one of said screw-threaded portions and its adjacent crank-seat, with a screw-threaded portion of less diameter than the first-mentioned screw-threaded portion; a clutch disk provided with a peripheral slot and a bolt-seat and screwed onto the last-mentioned screw-threaded portion, said clutch-disk being fixed against rotation on the axle; a spring-case rotatable on the clutch-disk and provided with an externally screw-threaded jam portion; a stop fixed to the spring-case and extending into the peripheral slot to limit the rotation of the spring-case relative to the clutch-disk; a crank screwed onto the spring-case and rotatably secured to the axle; means to prevent the crank from moving along the axle and yet leaving the crank free to rotate relative to the axle; a spring inside the spring-case fastened to the crank-axle and to the spring-case; a bolt movably mounted in the crank and adapted to be inserted into and withdrawn from the bolt-seat in the clutch-disk, a spring to normally hold the bolt in the bolt-seat, and means operable by the foot of the rider to withdraw the bolt.

7. In a motor-cycle, a crank-hanger; a crank-axle therein provided at its ends with crank-seats and with reversely screw-threaded portions to receive ball-bearing elements and between one of said screw-threaded portions and its adjacent crank-seat with a screw-threaded portion of less diameter than the first-mentioned screw-threaded portion; a clutch-disk provided with a peripheral slot and a bolt-seat and screwed onto and fixed on the last-mentioned screw-threaded portion, said clutch-disk being thereby fixed against rotation on the axle; a spring-case rotatable on the clutch-disk and provided with an externally screw-threaded jam portion; a stop fixed to the spring-case and extending into the peripheral slot to limit the rotation of the spring-case relative to the clutch-disk, a crank screwed onto the spring-case and rotatably secured to the axle; means to prevent the crank from moving along the axle and yet leaving the crank free to rotate relative to the axle; a spring inside the spring-case fastened to the crank-axle and to the spring-case; a bolt movably mounted in the crank and adapted to be inserted into and withdrawn from the bolt-seat in the clutch-disk; a spring to normally hold the bolt in the bolt-seat, and means operable by the foot of the rider to withdraw the bolt, said clutch-disk being also provided with a ratchet-seat in which the bolt may engage for the purpose of turning the disk in one direction and to allow the spring to move the crank in the other direction to bring the bolt out of the ratchet-seat and into the bolt-seat.

In testimony whereof, I have hereunto set my hand at Los Angeles, California, this 29th day of February, 1908.

ALEXANDER LUKE WALTERS.

In presence of—
JAMES R. TOWNSEND,
M. BEULAH TOWNSEND.

It is hereby certified that in Letters Patent No. 950,197, granted February 22, 1910, upon the application of Alexander Luke Walters, of Los Angeles, California, for an improvement in "Adjustable Crank-Hangers for Motor-Cycles," errors appear in the printed specification requiring correction as follows: Page 2, line 30, the word "secured" should read *screwed*, and same page, line 37, the reference-numeral "31" should read *32;* and that the said Letters Patent should be read with these corrections therein that the same may conform to the record of the case in the Patent Office.

Signed and sealed this 5th day of April, A. D., 1910.

[SEAL.]

C. C. BILLINGS,
*Acting Commissioner of Patents.*